United States Patent
Tune et al.

(10) Patent No.: US 9,892,072 B2
(45) Date of Patent: Feb. 13, 2018

(54) TRANSACTION RESPONSE MODIFICATION WITHIN INTERCONNECT CIRCUITRY

(71) Applicant: ARM LIMITED, Cambridge (GB)

(72) Inventors: Andrew David Tune, Sheffield (GB); Arthur Brian Laughton, Sheffield (GB); Daniel Adam Sara, Sheffield (GB); Sean James Salisbury, Sheffield (GB); Peter Andrew Riocreux, Sheffield (GB)

(73) Assignee: ARM Limited, Cambridge (GB)

( * ) Notice: Subject to any disclaimer, the term of this patent is extended or adjusted under 35 U.S.C. 154(b) by 193 days.

(21) Appl. No.: 14/874,801

(22) Filed: Oct. 5, 2015

(65) Prior Publication Data
US 2016/0103776 A1    Apr. 14, 2016

(30) Foreign Application Priority Data
Oct. 14, 2014  (GB) .................................. 1418142.4

(51) Int. Cl.
| G06F 13/00 | (2006.01) |
| G06F 13/364 | (2006.01) |
| G06F 13/42 | (2006.01) |

(52) U.S. Cl.
CPC ........ G06F 13/364 (2013.01); G06F 13/4282 (2013.01)

(58) Field of Classification Search
CPC .......................... G06F 13/364; G06F 13/4282
See application file for complete search history.

(56) References Cited

U.S. PATENT DOCUMENTS

| 6,292,872 B1 * | 9/2001 | Arimilli ............. G06F 12/0833 711/141 |
| 7,124,231 B1 | 10/2006 | Garner et al. |
| 8,601,169 B1 | 12/2013 | Paragaonkar et al. |
| 2003/0217239 A1 | 11/2003 | Jeddeloh |
| 2004/0024948 A1 * | 2/2004 | Winkler ................. G06F 13/36 710/311 |
| 2006/0059312 A1 * | 3/2006 | Peled .................. G06F 12/0862 711/137 |
| 2008/0301256 A1 * | 12/2008 | McWilliams ....... G06F 12/0284 709/214 |
| 2012/0159037 A1 | 6/2012 | Kwon et al. |

(Continued)

OTHER PUBLICATIONS

"Fetch Gating Control through Speculative Instruction Window Weighting" by Hans Vandierendonck and Andr'e Seznec, Transactions on HiPEAC II, LNCS 5470, pp. 128-148, 2009.*

(Continued)

*Primary Examiner* — Jing-Yih Shyu
(74) *Attorney, Agent, or Firm* — Nixon & Vanderhye P.C.

(57) ABSTRACT

Interconnect circuitry for connecting transaction masters to transaction slaves includes response modification circuitry. The response modification circuitry includes shortlist buffer circuitry storing identification for modification target transaction responses. The response modification circuitry uses this identification data to identify among a stream of transaction responses in transit a modification target transaction response. The response modification circuitry then serves to form a modified transaction response to be sent in place of the modification target transaction response to the transaction master.

17 Claims, 4 Drawing Sheets

(56) References Cited

U.S. PATENT DOCUMENTS

2013/0036465 A1* 2/2013 Chuan ............... G06F 21/85
726/22
2014/0082121 A1* 3/2014 Tune ............... G06F 12/0895
709/213
2014/0143487 A1* 5/2014 Habusha ........... G06F 12/0831
711/105

OTHER PUBLICATIONS

"Instruction Cache Fetch Policies for Speculative Execution" by Dennis Lee, Jean-Loup Baer, Brad Calder and Dirk Grunwald, 22nd Annual International Symposium on Computer Architecture, Italy, Jun. 1995.*
"ARM® CoreLink™ CCI-400 Cache Coherent Interconnect Technical Reference Manual" Revision: r1p4, ARM, Mar. 17, 2014.*
UK Search Report dated Apr. 22, 2015 in GB 1418142.4, 4 pages.

* cited by examiner

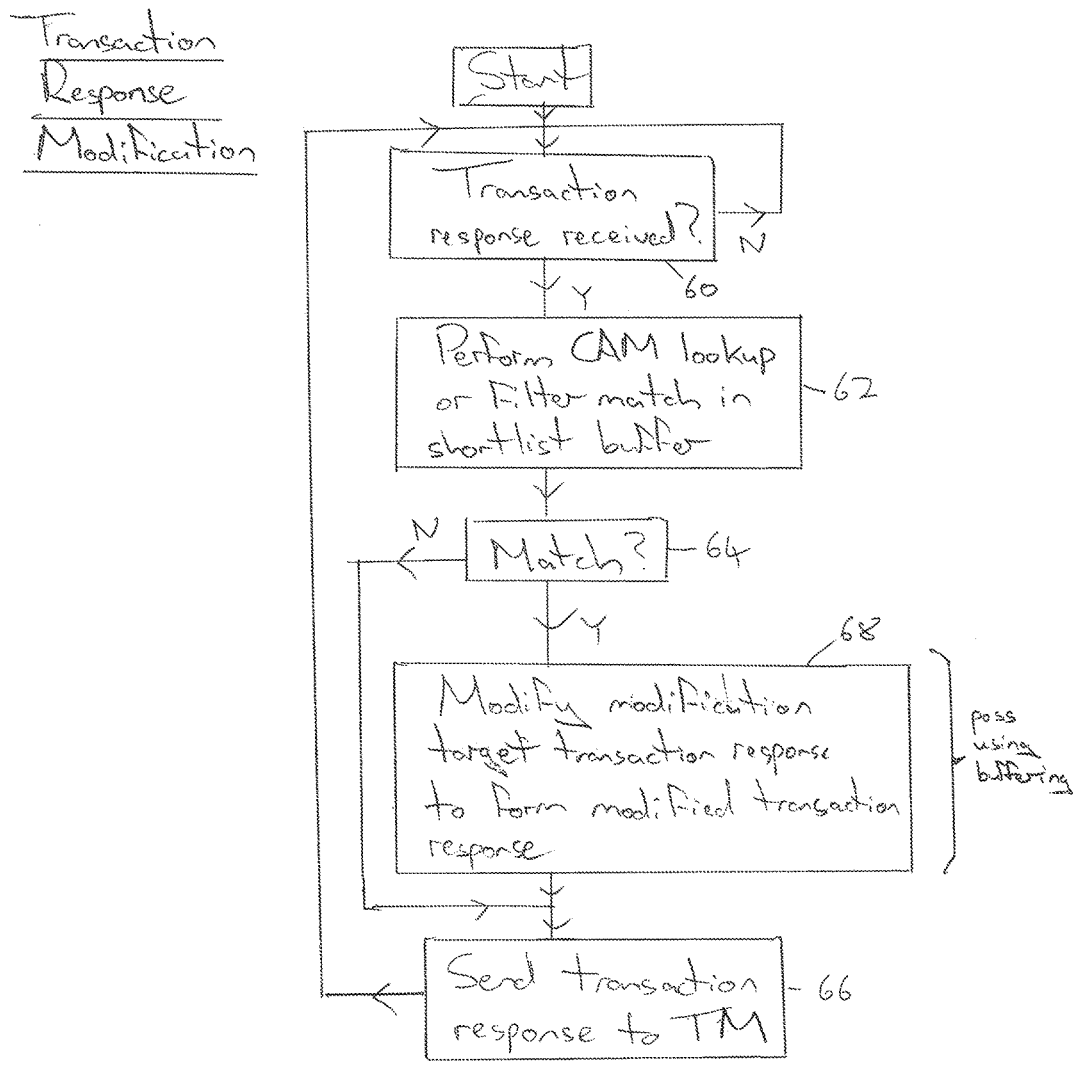

TRANSACTION RESPONSE MODIFICATION WITHIN INTERCONNECT CIRCUITRY

This application claims priority to GB Patent Application No. 1418142.4 filed 14 Oct. 2014, the entire content of which is hereby incorporated by reference.

BACKGROUND

Field

This disclosure relates to the field of data processing systems. More particularly, this disclosure relates to interconnect circuitry for connecting at least one transaction master to at least one transaction slave.

Description

It is known to provide interconnect circuitry for connecting one or more transaction masters to one or more transaction slaves. Such interconnect circuitry may be used, for example, within system-on-chip (SoC) integrated circuits. As the systems within which such interconnect circuitry become more complex, such as, for example, supporting coherency protocols, division of burst transfers, enforcement of atomic operations, speculative fetches etc., the requirements upon the interconnect circuitry in terms of managing the transactions being conveyed have increased.

SUMMARY

At least some example embodiments of the present disclosure provide an apparatus comprising:
response modification circuitry to:
store identification data for modification target transaction responses in a shortlist buffer;
identify, using the identification data stored in the shortlist buffer, a modification target transaction response in a stream of transaction responses in transit from a transaction slave to a transaction master; and
modify the modification target transaction response to form a modified transaction response to be sent to the transaction master.

At least some further example embodiments of the present disclosure provide apparatus comprising:
response modification means for:
storing identification data for modification target transaction responses in a shortlist buffer;
identifying, using the identification data stored in the shortlist buffer, a modification target transaction response in a stream of transaction responses in transit from a transaction slave to a transaction master; and
modifying the modification target transaction response to form a modified transaction response to be sent to the transaction master.

At least some further example embodiments of the present disclosure provide a method comprising:
storing identification data for modification target transaction responses;
identifying, using the identification data stored in a shortlist buffer, a modification target transaction response in a stream of transaction responses in transit from a transaction slave to a transaction master; and
modifying the modification target transaction response to form a modified transaction response to be sent to the transaction master.

The above, and other objects, features and advantages of this disclosure will be apparent from the following detailed description of illustrative embodiments which is to be read in connection with the accompanying drawings.

DRAWINGS

FIG. 1 schematically illustrates a data processing apparatus including a plurality of transaction masters connected via interconnect circuitry to a plurality of transaction slaves;

FIG. 2 schematically illustrates response modification circuitry and transaction tracking circuitry provided at a port where one or more transaction master connects to interconnect circuitry;

FIG. 4 is a flow diagram schematically illustrating transaction response modification.

EMBODIMENTS

Figure 1:
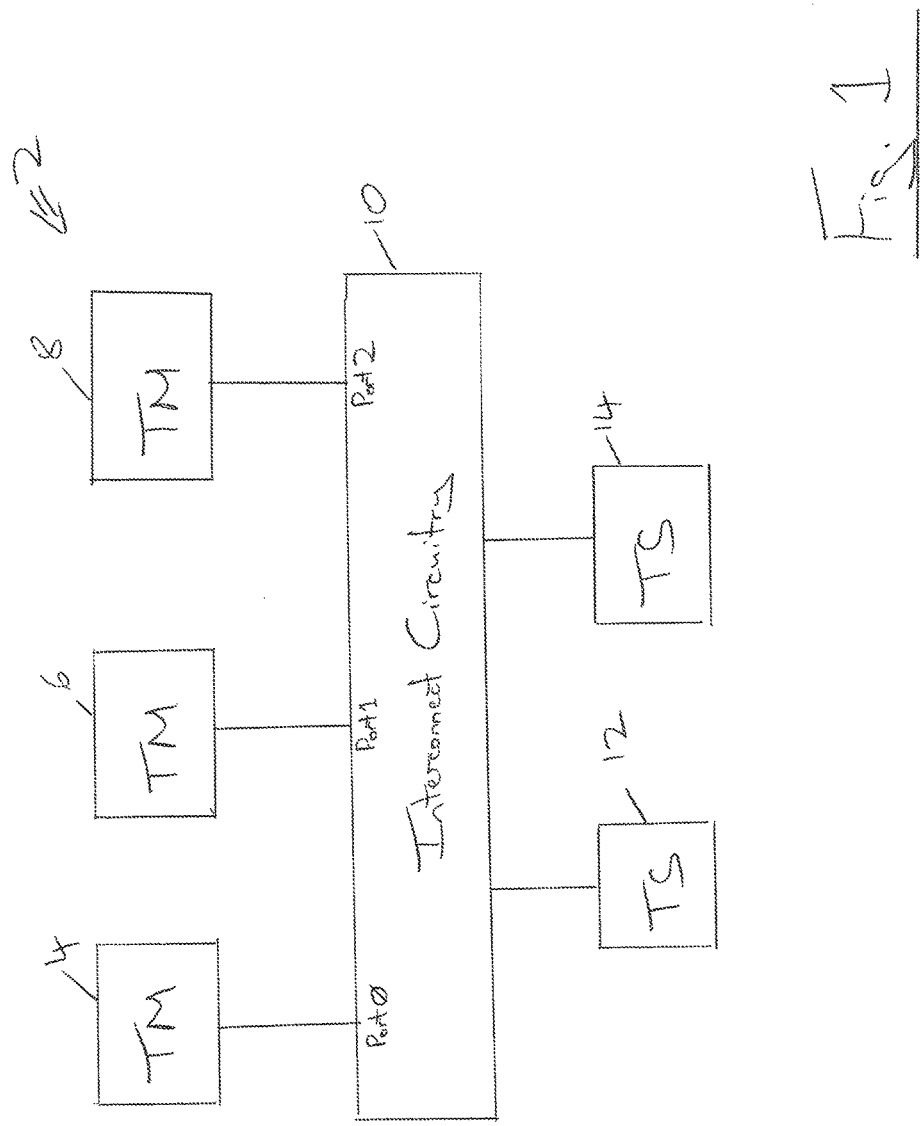

FIG. 1 schematically illustrates a data processing apparatus 2, which may, for example, be a system-on-chip (SoC) integrated circuit, including a plurality of transaction masters 4, 6, 8 connected via interconnect circuitry 10 to a plurality of transaction slaves 12, 14. The interconnect circuitry 10 serves to connect the transaction masters 4, 6, 8 to the transaction slaves 12, 14 such that a transaction master 4, 6, 8 may issue a transaction request to a transaction slave 12, 14 and the transaction slave 12, 14 subsequently issue a transaction response to the transaction master 4, 6, 8. Various transaction protocols may be used to support such transactions. These protocols include the AMBA AXI ACE protocols as designed by ARM Limited of Cambridge, England. When a transaction response is being returned, there are circumstances in which this transaction response may need to be modified by the interconnect circuitry 10 before it reaches the relevant transaction master 4, 6, 8. Such a transaction response accordingly needs to be identified as it is returning to the transaction master 4, 6, 8 and then modified to produce a modified transaction response.

The modification performed may take a variety of different forms. In some example embodiments a burst transaction issued by a transaction master 4, 6, 8 may be divided down by the interconnect circuitry 10 into a plurality of shorter burst transactions which may be more readily handled. The interconnect circuitry 10 is then responsible for modifying the transaction responses corresponding to the shorter burst transactions so as suppress marking of each of these shorter bursts as completed, except for the last transaction response corresponding to the last of the shorter burst transactions to be returned. Thus, the transaction master which issued the initial longer burst transaction will receive a sequence of transaction responses with only the last of these being marked as completed in a manner such that the division of the larger burst transaction into a plurality of shorter burst transactions may be transparent to the transaction master.

Another example of the type of modification which may be performed on a transaction response relates to atomic transactions. Such atomic transactions are intended to be performed and completed together. In some circumstances this atomic behaviour is monitored by the interconnect circuitry 10. Where this is the case, the interconnect circuitry 10 may serve to modify a transaction response among the atomic transaction responses so as to indicate success or failure of the atomic operation specified by that group of atomic transactions.

Another example form of transaction response modification concerns example embodiments in which the interconnect circuitry 10 is responsible for indicating information concerning the coherency state of some data being accessed, e.g. a cache block. Whilst such coherency data might normally be provided by the downstream targets of the transaction, in some cases, this coherency state is determined by the interconnect circuitry 10 (or home node) and the transaction response may be modified to indicate this coherency state.

A further example of transaction response modification concerns speculative fetches. It is known to provide systems in which the interconnect circuitry 10 may issue speculative fetches of data or instructions. Subsequent to the issue of such speculative fetches, it may be determined that those fetches should be stalled, or in the case of a hazard, discarded. The interconnect circuitry 10 may stall or discard the transaction responses returned for such speculative fetches The transactions between the transaction masters 4, 6, 8 and the transaction slaves 12, 14 may be marked with respective identifiers. These identifiers may be shared by the transaction requests and the transaction responses within the stream of transaction requests and transaction responses. These identifiers may be used to assist in correlating between transaction requests and transaction responses. The identifiers can have a variety of different forms. Examples of the forms of identifier which may be used individually, or in combination, include a thread identifier of a processing thread generating the transaction concerned, a port identifier of a port of the interconnect circuitry to which the issuing transaction master is coupled and/or a logical processor identifier for a logical processor generating the transactions concerned.

The identifiers may not be unique such that a plurality of outstanding transactions at any given time may be permitted to share an identifier. Within such example embodiments, transaction tracking circuitry may be provided to track the outstanding transactions within the interconnect circuitry 10 so as to assist in the correlation between transaction requests and transaction responses. This transaction tracking circuitry may be used to assist in simplifying the task of transaction response modification. More particularly, the transaction tracking circuitry may be formed so as to block the sending of a given transaction request with a given identifier to a transaction slave 12, 14, if a corresponding given transaction response will require modification, unless that corresponding given transaction response is guaranteed to be a first transaction response which will bear the given identifier that can be returned to the requesting transaction master 4, 6, 8 as managed by the transaction tracking circuitry. Arranging that the transaction tracking circuitry controls the issue of transaction requests so as to simplify the task of transaction response modification enables a simplification in the mechanisms which perform transaction request modification thereby reducing their impact upon performance, while not unduly restricting transaction request issue in most real life processing workloads.

Within the context of such example embodiments, the transaction tracking circuitry may be arranged to store the identification data for a given transaction request into shortlist buffer circuitry which is responsible for identifying transaction responses which are returned and which require modification. The transaction tracking circuitry may block the sending of transaction requests if they will require transaction response modification and there is (currently) insufficient storage within the shortlist buffer circuitry to store identification data to identify the transaction response which will require modification.

Figure 2:
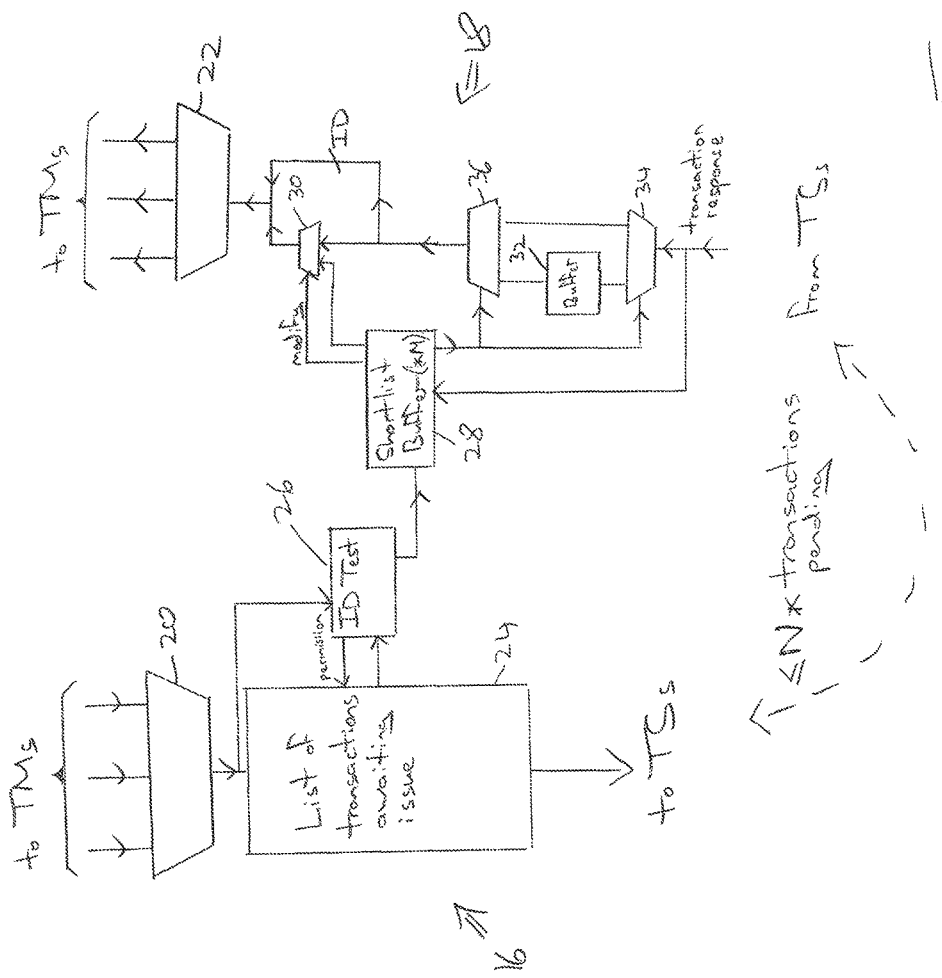

FIG. 2 schematically illustrates an instance of transaction tracking circuitry 16 and response modification circuitry 18 which may be provided at each port of the interconnect circuitry 10 coupled to a respective transaction master 4, 6, 8 as illustrated in FIG. 1. It will be appreciated that in some embodiments, multiple transaction masters 4, 6, 8 may be connected to a single port and accordingly multiplexing and demultiplexing of transaction requests and responses may be performed by the multiplexer 20 and the demultiplexer 22. The transaction tracking circuitry 16 includes a transaction issue store buffer 24 storing a list of transactions awaiting issue via the interconnect circuitry 10 to respective transaction slaves 12, 14. The interconnect circuitry 10 may be formed so as to support up to N (N is a positive integer) pending transactions emanating from a given port (or group of ports) and returning to that given port (or group of ports) at a later time (a shared transaction tracker may be used in some embodiments, which tracks a sum of transactions emanating from all (or a group of) ports). ID test circuitry 26 coupled to the transaction issue store buffer 24 serves to control when transaction requests are issued to the interconnect circuitry 10 by generating an appropriate permission signal. The tests performed by the ID test circuitry 26 include tests associated with identifier reuse by the transaction protocol (e.g. AMBA AXI with the ACE extension). A further test which may be performed by the ID test circuitry 26 is one associated with the response modification circuitry 18. In particular, the response modification circuitry 18 includes shortlist buffer circuitry 28 with only a limited capacity for storing identification data for up to M modification target transaction responses. M is an integer which is less than N (the number of potentially pending transactions at a given time) and accordingly the storage capacity of the shortlist buffer circuitry 28 is a resource which requires careful management. The shortlist buffer circuitry 28 may be in the form a content addressable memory (CAM), which may be forms of flops rather than a conventional CAM structure, to permit identifiers within transaction responses to be compared with the identification data stored in the shortlist buffer circuitry 28 at high speed, thereby reducing the delay associated with the return path for the transaction responses.

The ID test circuitry 26 may serve to assist the operation of the shortlist buffer circuitry 28 by blocking sending of a given transaction request with a given identifier to a transaction slave if a corresponding given transaction response for that transaction request requires modification by the response modification circuitry 28 unless the ID test circuitry 26 is able to determine that the corresponding given transaction response will be a first transaction response including the given identifier that can be returned to the transaction master via the response modification circuitry 18. In this way, the shortlist buffer circuitry 28 may be unburdened from the requirement of dealing with transactions which share identifiers by determining which of the transaction responses with a shared identifier is the one which requires modification.

In some embodiments the identification data stored within the shortlist buffer circuitry 28 may include a counter value. This may be used as one way of managing modification for a plurality of transaction responses which require modification and which share the same identifier. As an example, a burst transaction may be split into a plurality of shorter burst transactions which each share the same identifier. The shorter burst transactions may be sent to the relevant transaction slave 12, 14 and when the transaction responses are returned, then the number of these returned transaction responses may be tracked using the counter value within the shortlist buffer circuitry 28 to determine when the last of these transaction responses has been returned. The preceding transfer responses can be modified so that they are not marked as completed, whereas the last of the transaction responses, which is marked as complete, will be allowed to proceed unmodified. Accordingly, the transaction master 4, 6, 8 which receives the sequence of shorter burst transaction responses will only see the last of these as being marked as complete in a manner consistent with the longer burst transaction which it initially issued. The transaction tracking circuitry 16 may be responsible for incrementing the count value stored within the shortlist buffer circuitry 28 as each of these shorter burst transactions is issued. The shortlist buffer circuitry 28 may be responsible for decrementing this counter value as each of the shorter burst transaction responses passes through the response modification circuitry until the final shorter burst transaction response is identified.

The response modification circuitry 18 uses the identifier in the received transaction response to identify among a stream of transaction responses that are being returned, whether any of these correspond to a modification target transaction response which should be modified. If the response medication circuitry using the identification data stored within the shortlist buffer circuitry 28 identifies a modification target transaction response, then this modification target transaction response may be modified by the action of the multiplexer 30 introducing substitute values into the modification target transaction response to form a modified transaction response which is passed to the demultiplexer 22. If no modification is needed, then the multiplexer 30 can pass the transaction response in an unmodified form to the demultiplexer 22.

The shortlist buffer circuitry 28 may directly store identifier values (and potentially count values) associated with modification target transaction responses to be identified and modified. In other embodiments, the identification data may take the form of filter data and the shortlist buffer circuitry 28 take the form of a filter, such as a Bloom filter, for identifying candidate modification target responses. In such embodiments, an imprecise (e.g. subject to false positives) identification of modification target transaction responses may be made and then confirmed, such as by reference to the transaction tracking circuitry 16, before a modified transaction response is actually generated and returned. In practice, as only a relatively small number of transaction responses require modification, the additional time taken to confirm such a modification may not introduce a disadvantageous decrease in performance.

The response modification circuitry 18 may include buffer circuitry 32 serving to buffer candidate modification target responses while a check is performed if a transaction response modification is actually required. If the filter data within the shortlist buffer circuitry 28 does not indicate that a transaction response is a candidate modification target response, then the buffer circuitry 32 may be bypassed by the multiplexers 34, 36 as illustrated.

Figure 3:
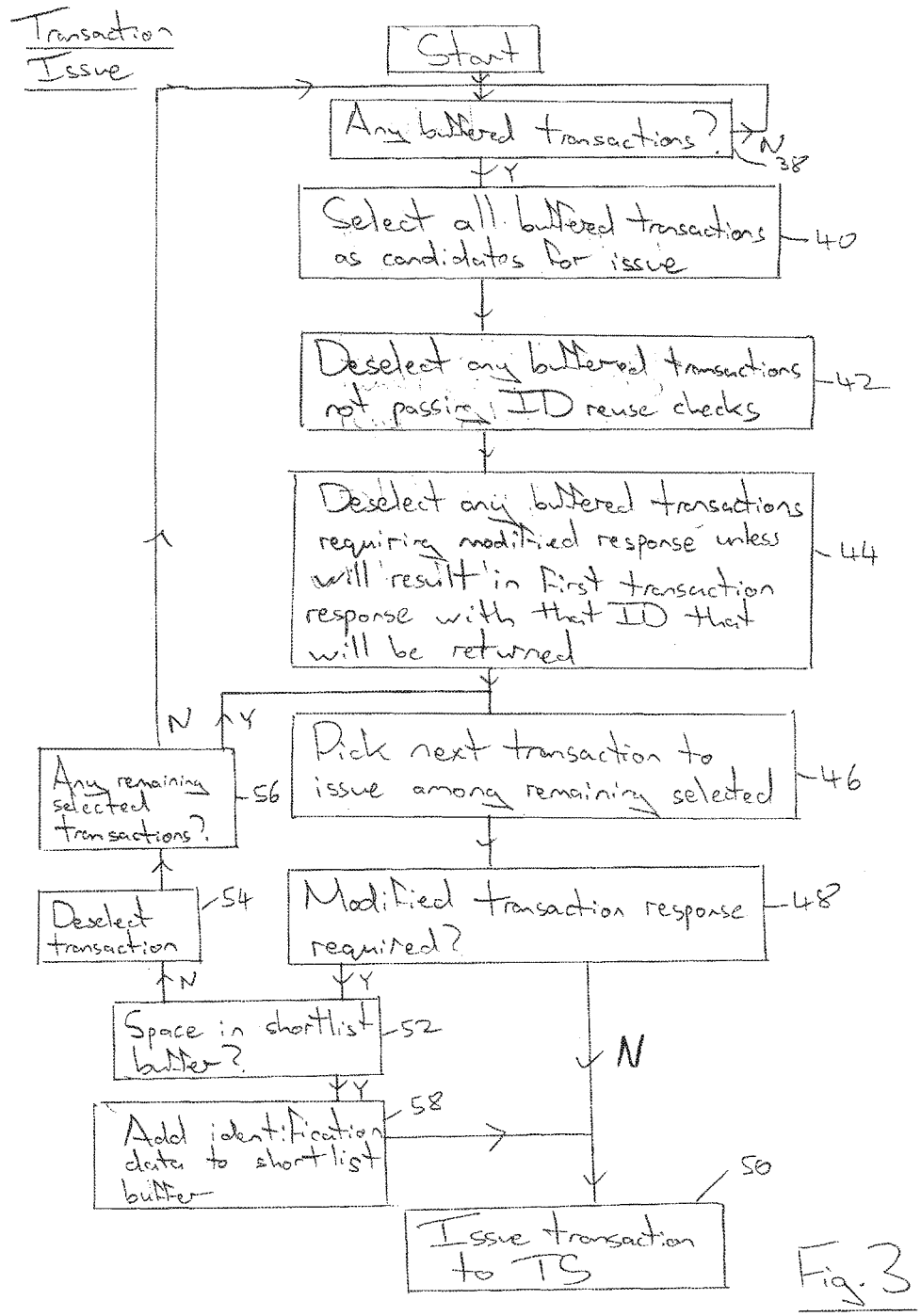
FIG. 3 is a flow diagram schematically illustrating transaction issue.

FIG. 3 is a flow diagram schematically illustrating one example of transaction issue. This example is simplified in that it does not directly illustrate the behaviour to support a system where transaction responses sharing the same identifier value and requiring the same modification are tracked via a counter as previously described. Such embodiments may be supported by the transaction tracking circuitry 16 tracking how many pending transactions with the same identifier and requiring the same modification have been issued and notifying the shortlist buffer circuitry 28 when another of such transactions is issued by incrementing a count value held within the shortlist buffer circuitry 28. Other modifications to the operation illustrated in FIG. 3 are also possible and are encompassed within the present techniques.

At step 38 the transaction tracking circuitry 16 waits until there are buffered transactions which require issue from the transaction issue store buffer 24. When there are such transactions to issue, then step 40 marks all of these as candidates for issue. Step 42 then deselects any buffered transactions which do not pass their identifier reuse checks. These identifier reuse checks can have a variety of different forms, and are typically required in order to manage the correlation between transaction requests and transaction responses within systems which permit identifier reuse.

Step 44 deselects any buffered transactions which require a modified transaction response unless the transaction tracking circuitry 16 can determine that if that transaction is issued, then the first transaction response with the identifier of the issued transaction that will be returned will properly correspond to that issued response.

Step 46 serves to pick among the still selected buffered transactions a next transaction to issue. This picking may be performed using various techniques, such as identifying the oldest buffered transaction, the transaction with the highest priority or a combination of these or other factors.

Step 48 determines whether or not the transaction which has been picked for issue is one which requires a modified transaction response. If a modified transaction response is not required, then step 50 issues the transaction to the transaction slave 12, 14.

If a modified transaction response is identified as being required at step 48, then step 52 determines whether or not space is available within the shortlist buffer circuitry 28 to store an identifier for that modification target transaction response. If storage space is not available, then step 54 deselects that transaction for issue. Step 56 then determines whether there are any more remaining selected transactions. If there are no remaining selected transactions, then processing returns to step 38. If there are further remaining selected transactions which could potentially be issued, then processing returns to step 46.

If the determination at step 52 is that there is storage space available within the shortlist buffer circuitry 28 to store identification data for the modification target transaction response, then step 58 serves to add the identification data concerned to the identification data stored within the shortlist buffer circuitry 28. The identification data stored at the shortlist buffer circuitry 28 could take the form of the identifier of the transaction concerned together with an indication of the modification required. Other examples of the identification data may include a modification of filter data (e.g. Bloom filter data) stored by the shortlist buffer circuitry 28. The identification data may also include a count value as previously described in the case of multiple transaction responses sharing the same identifier and requiring the same modification.

FIG. 4 is a flow diagram schematically illustrating transaction response modification as performed by the response modification circuitry 18. At step 60 processing waits until a transaction response is received. When a transaction response is received, then step 62 performs a content addressable lookup (which may be performed in flops rather than a normal CAM structure), or a filter match, within the shortlist buffer circuitry 28 depending upon the embodiment concerned. Step 64 determines whether or not a match has been found. If a match has not been found, then processing proceeds to step 66 where the transaction response is returned to the transaction masters 4, 6, 8. If a match is found at step 64, then step 68 serves to modify the modification target transaction response to form a modified transaction response before that modified transaction response is sent to the transaction master at step 66. The modification performed could take a variety of different forms as previously discussed. The modification may, for example, concern the success or failure of an atomic operation being performed as a sequence of atomic transactions, may indicate coherency state as managed by the interconnect circuitry 10 or other circuitry other than the transaction slave 12, 14. The interconnect circuitry 10 may also stall or discard a speculative fetch transaction. Further examples of modification of transaction responses are also possible. As previously mentioned, the modification target transaction response may be stored within the buffer circuitry 32 while a determination is made as to the particular form of modification to be performed, or the possibility of a false positive removed in the case of an imprecise filter-based identification.

In at least some example embodiments the shortlist buffer circuitry is able to use the identification data to identify modification target transaction responses without having to track all of the outstanding transaction responses in the system, of which only a small subset are likely to requirement modification. The shortlist buffer circuitry may, in at least these example embodiments, be advantageously smaller in terms of gate count, consume less power and operate more quickly.

The transactions which pass between the transaction master and the transaction slave may, in some example embodiments have respective identifiers and the transaction responses may include these identifiers. The identifiers can have a variety of different forms including, for example, a thread identifier of a processing thread generating the transaction, a port identifiers of a port of the interconnect circuitry to which a transaction master issuing the transaction is coupled, a logical processor identifier of a logical processor generating a transaction.

In some example interconnect systems, the identifiers which are used may not be unique such that a plurality of outstanding transactions are permitted to share an identifier.

In order to help manage the sharing of identifiers some example embodiments may include transaction tracking circuitry serving to track outstanding transactions within the interconnect circuitry. This transaction tracking circuitry may be used to assist the operation of the shortlist buffer circuitry, with its limited storage capability, by serving to block the sending of a given transaction request with a given identifier, if a corresponding given transaction response which requires modification by the response modification circuitry, unless that given transaction response is sure to be the first transaction response including the given identifier that can be returned to the transaction master. Accordingly, the shortlist buffer circuitry and the response modification circuitry can be relived of the burden of managing the existence of multiple transaction responses which may share the same identifier as the transaction tracking circuitry by gating transaction issue has ensured that the first transaction response they will receive will be the one which requires modification.

In some example embodiments, the transaction tracking circuitry may itself serve to store the given identification data for the given transaction into the shortlist buffer circuitry when the corresponding given transaction request is permitted to be sent to the transaction slave. The transaction tracking circuitry may thus be responsible for populating the shortlist buffer circuitry.

In some example embodiments the transaction tracking circuitry may be configured to block sending of a given transaction if the shortlist buffer circuitry does not have empty storage capacity to store identification data for modifying a given transaction response corresponding to that given transaction request. This may ensure that the limited storage capabilities of the shortlist buffer circuitry are not overwhelmed.

In some example embodiments, the shortlist buffer circuitry may be formed as content addressable memory. Such content addressable memory may be rapidly accessed in a manner which assists in reducing the latency associated with a transaction as a consequence of transaction response modification mechanisms.

In some embodiments the interconnect circuitry may have a plurality of ports configured to return transaction responses to one or more respective transaction masters. Within the context of such example embodiments, there may be provided an instance of the response modification circuitry at each of these ports so as to modify transaction responses returned via that port to one or more associated transaction masters.

In some example embodiments, a plurality of transaction responses may be identifiable with shared identification data and require a common modification. In such example embodiments storage space may be preserved within the shortlist buffer circuitry by using a shared entry within the shortlist buffer circuitry to represent such a plurality of transaction responses. Such a shared entry may in some embodiments include a counter value indicating a number of transaction responses with shared identification data which are to be sent from the transaction slave to the transaction master and are to be tracked by the shared entry within the shortlist buffer circuitry.

One particular example of a plurality of transaction responses sharing identification data arises when a burst transaction is split within the interconnect circuitry into a plurality of shorter burst transactions. Within this context, the transaction responses for those shorter burst transactions may be modified such that marking of each of the shorter burst transactions as completed is suppressed for all but the last transaction response among the shorter burst transactions.

In some example embodiments, the response modification circuitry may include buffer circuitry serving to buffer a modification target that has been identified while the modified transaction response is generated. Such buffer circuitry gives additional time for generation of the modified transaction response thereby easing timing constraints upon the operation of the response modification circuitry and/or reducing the latency associated with the return of the transaction response when this does not require modification.

While it would be appreciated that the shortlist buffer circuitry may store identification data having a form whereby each entry within the identification data uniquely identifies a particular transaction response with a given identifier (or a plurality of responses sharing such an identifier), it is also possible to provide embodiments in which the shortlist buffer circuitry comprises filter circuitry and the identification data comprises filter data used to identify candidate modification target responses. The identification data in the form of filter data may not uniquely and deterministically identify a transaction response as being a modification target response, but rather indicate that it may be a candidate modification target response.

Examples of such filter circuitry may include Bloom filter circuitry. When a candidate modification target transaction response has been identified, this may be buffered and checked to determine whether or not it is actually a modification target transaction response which requires modification.

As previously mentioned, the modified transaction response may be modified in a variety of different ways compared to the transaction response which is received at the response modification circuitry. These modifications may include, for example, an indication of success of an atomic transaction as determined by the interconnect circuitry itself, coherency state information not determined by the transaction slave (e.g. managed by the interconnect circuitry), and/or a transaction response indicating how speculative fetch transactions should be handled after issue (e.g. a speculative fetch may turn out not to be required and the data may be marked as to be discarded).

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
   response modification circuitry to:
   store identification data for modification target transaction responses in a shortlist buffer;
   identify, using the identification data stored in the shortlist buffer, a modification target transaction response in a stream of transaction responses in transit from a transaction slave to a transaction master; and
   modify the modification target transaction response to form a modified transaction response to be sent to the transaction master,
   wherein transactions between said transaction master and said transaction slave have respective identifiers and transaction responses within said stream of transaction responses include said identifiers,
   wherein said identifiers are not unique such that a plurality of said outstanding transactions are permitted to share an identifier, and
   wherein said apparatus further comprises transaction tracking circuitry configured to track said outstanding transactions within said apparatus, wherein said transaction tracking circuitry is configured to block sending of a given transaction request with a given identifier to said transaction slave when a corresponding given transaction response requires modification by said response modification circuitry unless said corresponding given transaction response is a first transaction response including said given identifier that can be returned to said transaction master.

2. The apparatus as claimed in claim 1, wherein said apparatus is configured to support up to N outstanding transactions between said transaction master and said transaction slave and said shortlist buffer configured to store identification data for up to M modification target transaction responses, where M is less than N.

3. The apparatus as claimed in claim 1, wherein said identifiers comprise one or more of:
   thread identifiers of respective processing threads generating said transactions;
   a port identifier of a port of interconnect circuitry via which said transaction master is coupled to said apparatus; and
   logical processor identifiers of a logical processor generating said transactions.

4. The apparatus as claimed in claim 1, wherein said transaction tracking circuitry is configured to store given identification data for said given transaction request to said shortlist buffer when said corresponding given transaction request requires modification and is permitted to be sent to said transaction slave by said transaction tracking circuitry.

5. The apparatus as claimed in claim 4, wherein said transaction tracking circuitry is configured to block sending of said given transaction request if said shortlist buffer does not have empty storage capacity to store said given identification data.

6. The apparatus as claimed in claim 1, wherein said shortlist buffer comprises a content addressable memory.

7. The apparatus as claimed in claim 1, comprising a plurality of ports configured to return transactions responses to respective transaction masters, wherein each of said plurality of ports has an instance of said response modification circuitry configured to modify transaction responses returned via that port.

8. Apparatus as claimed in claim 1, wherein a plurality of transactions responses identifiable with shared identification data and requiring a common modification are represented as a shared entry within said shortlist buffer.

9. An apparatus comprising:
   response modification circuitry to:
   store identification data for modification target transaction responses in a shortlist buffer;
   identify, using the identification data stored in the shortlist buffer, a modification target transaction response in a stream of transaction responses in transit from a transaction slave to a transaction master; and
   modify the modification target transaction response to form a modified transaction response to be sent to the transaction master,
   wherein a plurality of transactions responses identifiable with shared identification data and requiring a common modification are represented as a shared entry within said shortlist buffer, and
   wherein said shared entry includes a counter value indicating a number of transaction responses with said shared identification data to be sent from said transaction slave to said transaction master.

10. The apparatus as claimed in claim 8, wherein said plurality of transactions responses identifiable with shared identification data correspond to a burst transaction split within interconnect circuitry providing said apparatus into a plurality of shorter burst transactions and said modified transaction response for each of said shorter burst transactions, other than a last transaction response for said shorter burst transactions, suppresses marking each of said shorter burst transactions as completed.

11. The apparatus as claimed in claim 1, wherein said response modification circuitry include buffer circuitry configured to buffer a modification target transaction response identified while said modified transaction response to be generated.

12. The apparatus as claimed in claim 1, wherein shortlist buffer comprises filter circuitry and said identification data comprises filter data used to identify candidate modification target transaction responses.

13. The apparatus as claimed in claim 11, wherein said buffer circuitry is configured to buffer candidate modification target transaction responses while checking if a transaction response modification is required.

14. The apparatus as claimed in claim 1, wherein said modified transaction response indicates success of an atomic transaction as determined by said apparatus.

15. The apparatus as claimed in claim 1, wherein said modified transaction response indicates coherency state information not determined by said transaction slave.

16. The apparatus as claimed in claim 1, wherein said modified transaction response modifies how a speculative fetch transaction should be handled after issue.

17. A method comprising:

storing identification data for modification target transaction responses;

identifying, using the identification data stored in a shortlist buffer, a modification target transaction response in a stream of transaction responses in transit from a transaction slave to a transaction master; and modifying the modification target transaction response to form a modified transaction response to be sent to the transaction master, wherein transactions between said transaction master and said transaction slave have respective identifiers and transaction responses within said stream of transaction responses include said identifiers, wherein said identifiers are not unique such that a plurality of said outstanding transactions are permitted to share an identifier, and wherein said method further comprises: blocking sending of a given transaction request with a given identifier to said transaction slave when a corresponding given transaction response requires modification unless said corresponding given transaction response is a first transaction response including said given identifier that can be returned to said transaction master.

* * * * *